(12) United States Patent
Wong et al.

(10) Patent No.: US 6,753,100 B1
(45) Date of Patent: Jun. 22, 2004

(54) MAGNETIC RECORDING MEDIA HAVING ADJUSTABLE COERCIVITY USING MULTIPLE MAGNETIC LAYERS AND METHOD OF MAKING SAME

(75) Inventors: Bunsen Y. Wong, San Diego, CA (US); Bing Zhang, Fremont, CA (US); Kenneth E. Johnson, Morgan Hill, CA (US)

(73) Assignee: Maxtor Corporation, Longmont, CO (US)

( * ) Notice: Subject to any disclaimer, the term of this patent is extended or adjusted under 35 U.S.C. 154(b) by 245 days.

(21) Appl. No.: 09/584,764

(22) Filed: May 30, 2000

(51) Int. Cl.[7] .............................. G11B 5/66; G11B 5/70; B05D 5/12; C23C 14/34
(52) U.S. Cl. ........................ 428/694 TM; 428/694 TS; 428/694 TC; 428/336; 428/213; 428/900; 427/131; 204/192.2
(58) Field of Search .................... 428/694 TM, 694 TS, 428/694 TC, 336, 213, 900; 427/131; 204/192.1, 192.12, 192.15, 192.2

(56) References Cited

U.S. PATENT DOCUMENTS

| | | | |
|---|---|---|---|
| 4,652,499 A | | 3/1987 | Howard ....................... 428/641 |
| 5,693,426 A | | 12/1997 | Lee et al. .................... 428/611 |
| 5,763,071 A | * | 6/1998 | Chen et al. ................. 428/332 |
| 5,772,857 A | * | 6/1998 | Zhang ...................... 204/192.2 |
| 5,858,566 A | * | 1/1999 | Zhang .................. 428/694 TS |
| 6,143,388 A | * | 11/2000 | Bian et al. ................. 428/65.3 |
| 6,168,861 B1 | * | 1/2001 | Chen et al. ................. 428/336 |
| 6,280,813 B1 | * | 8/2001 | Carey et al. ............... 428/65.3 |

OTHER PUBLICATIONS

Song et al., "Magnetic Properties and REcording Performance of Multilayer Films of CoCrTa, CoCrPtTa, and CoCrPtTa with CoCrPtB", IEEE Trans. MAgn., vol. 30, No. 6, Nov. 1994, pp. 4011–4013.*

Lambeth, David N. et al., "Magnetic Media Performance: Control Methods for Crystalline Texture and Orientation", submitted for Publication in *MRS Proceedings* MRS Sym L: Paper #L8.1, Apr. 15, 1998 (Jun. 1, 1998), 12 pp.

* cited by examiner

*Primary Examiner*—Holly Rickman
(74) *Attorney, Agent, or Firm*—David M. Sigmond

(57) ABSTRACT

The coercivity of a magnetic recording medium such as a magnetic disk is determined by providing at least two magnetic layers in the recording medium with the relative thicknesses of the two magnetic layers determining coercivity without the need for changing substrate temperature, underlayer thickness or substrate biasing during manufacture. Each magnetic layer is a cobalt alloy of different composition and intrinsic magnetic properties. Importantly, the coercivity can be modified without adversely affecting remanence or squareness of the hysteresis transition region for the recording medium.

60 Claims, 3 Drawing Sheets

MAGNETIC RECORDING MEDIA HAVING ADJUSTABLE COERCIVITY USING MULTIPLE MAGNETIC LAYERS AND METHOD OF MAKING SAME

BACKGROUND OF THE INVENTION

This invention relates generally to magnetic recording media such as magnetic thin film recording disks, and more particularly the invention relates to a method of varying coercivity of a recording medium using a multiple magnetic layer construction.

The magnetic disk drive as used for data storage in computer systems comprises one or more disks having thin film magnetic layers on opposing surfaces for the recording of magnetic data as bits along concentric tracks. Typically, as shown in FIG. 1 the disk comprises a substrate 4 of nickel phosphorus (NiP) or ceramic glass on which a plurality of layers are formed by sputtering in a low pressure inert gas atmosphere. The layers include an optional magnetic seed-layer 6, a nonmagnetic underlayer 8 of either pure chromium (Cr) or a chrome alloy (CrX), covered by a magnetic layer 10 of a cobalt (Co)—based alloy. A protective layer 12 made of sputtered carbon (C) is typically used on top of the magnetic layer and an organic lubricant 14 may be used on top of the protective layer.

Data is recorded in the tracks on the disk surface by either vertical or longitudinal magnetization of the magnetic layer. Coercivity (Hr) is a measure of the magnetic field needed to switch polarization in the magnetic layer for the recording of magnetic data. A high magnetic coercivity is important to improve the recording parametric properties of the media and also to improve robustness against thermal decay of recorded information. The magnetic coercivity is controlled by a number of factors such as underlayer design, deposition conditions, and magnetic alloy selection. However, for a single film stack design, the three main parameters which can be used to enhance or reduce the coercivity are substrate temperature during sputtering (FIG. 2A), underlayer thickness (FIG. 2B), and substrate biasing when depositing the magnetic film (FIG. 2C).

Each of these parameters has limitations. As shown in FIG. 2A, while heater power and substrate temperature can increase coercivity, the remanence (Mrt) or magnetic flux density remaining after removal of applied magnetostrictive force decrease with temperature. Additionally, excessive heat can crystallize the substrate. Thus, equipment and substrate constraints limit the use of high sputtering temperatures.

In FIG. 2B it will be noted that increasing the thickness of the underlayer asymptotically increases coercivity, while increasing underlayer thickness to raise coercivity also increases media noise. FIG. 2C shows that the use of substrate biasing for coercivity control has a minimal effect.

The present invention is directed to a method of adjusting coercivity which overcomes the limitations in the prior art techniques.

SUMMARY OF THE INVENTION

In accordance with the invention, a method of varying coercivity in the manufacture of a magnetic recording medium comprises the steps of providing a substrate for supporting a magnetic layer, sputtering on the substrate an underlayer having a lattice structure for matching with a magnetic layer lattice structure, sputtering a first magnetic layer on the underlying layer, the first magnetic layer having a first alloy composition, and sputtering at least a second magnetic layer on the first magnetic layer, the second magnetic layer having a second alloy composition different from the first alloy composition in percentage composition or element composition. By varying the relative thickness of the first magnetic layer to the thickness of the two magnetic layers, the coercivity of the multiple magnetic layers can be varied to a desired or optimum value.

In preferred embodiments, the overall thickness of the multiple magnetic layers is the same as the single magnetic layer in the prior art, and the magnetic layers comprise a mixture of cobalt (Co) with one or more other elements.

The invention and objects and features thereof will be more readily apparent from the following detailed description and appended claims when taken with the drawings.

DESCRIPTION OF ILLUSTRATIVE EMBODIMENTS

Figure 1:
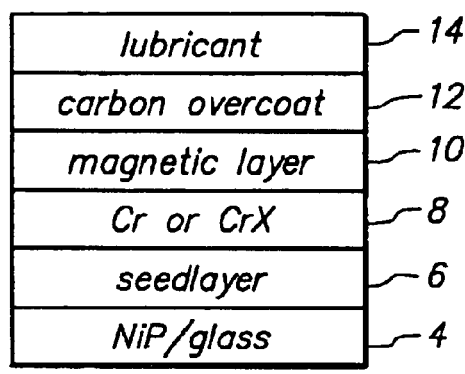
FIG. 1 is a schematic illustrating the multiple layers in a conventional thin film recording medium.
Figure 2A:
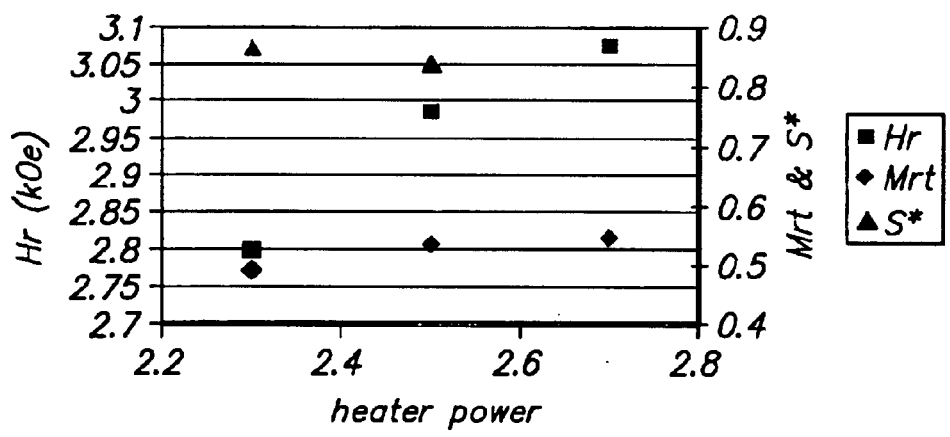
FIGS. 2A–2C are graphs illustrating the effects of substrate temperature, underlayer thickness, and electric bias on magnetic medium parameters.
Figure 2B:
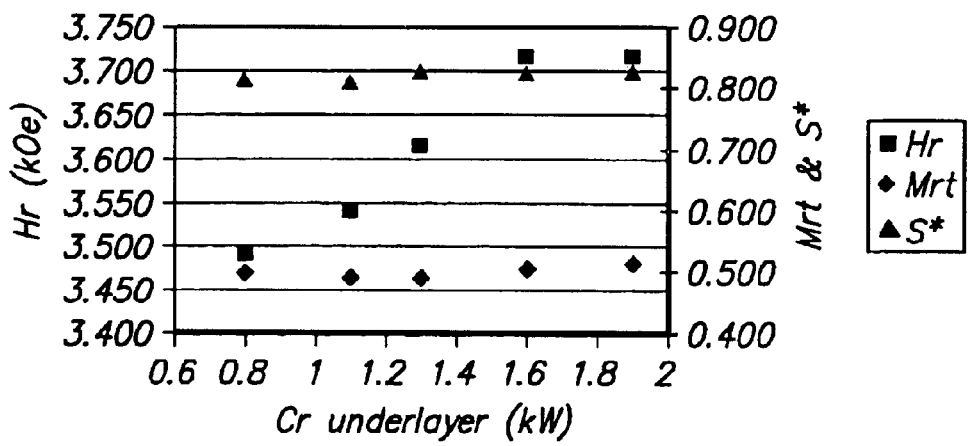
Figure 2C:
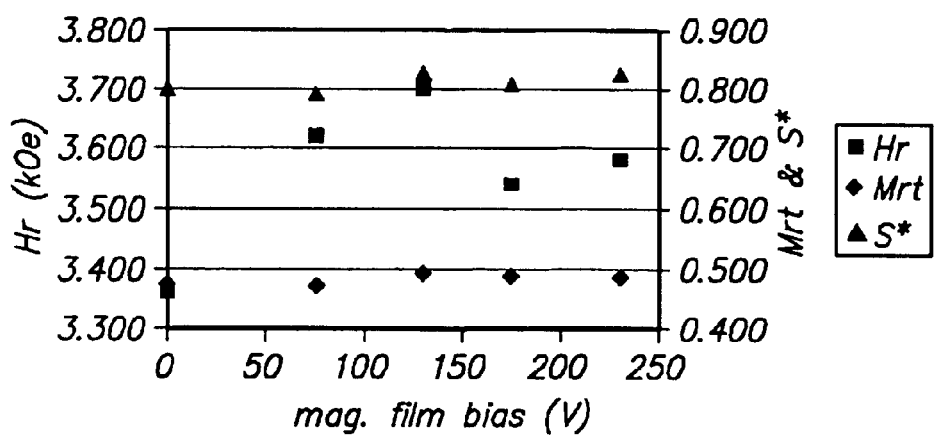
Figure 3:
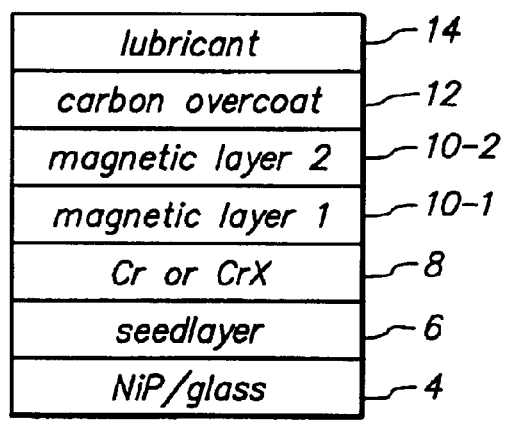
FIG. 3 is a schematic of a multi-magnetic layer recording medium in accordance with one embodiment of the invention.

FIG. 3 is a schematic illustrating a magnetic recording medium having multiple magnetic layer thin films for recording data in accordance with a preferred embodiment of the invention. Again, a nickel phosphorus (NiP) or ceramic glass substrate 4 is provided on which a seed-layer 6 is deposited with a chromium (Cr) or chrome alloy (CrX) layer 8 deposited on the seed-layer. In accordance with the invention, two magnetic layers 10-1 and 10-2 are deposited by sputtering with a carbon (C) overcoat 12 and lubricant layer 14 being deposited over the magnetic layers. By using a multiple magnetic layer construction the media coercivity can be altered without changing substrate temperature, underlayer thickness, or substrate biasing as is necessary in the prior art.

Each magnetic layer consists of a magnetic alloy of different composition and intrinsic magnetic properties. When deposited individually under the same conditions, they exhibit different coercivity. When deposited in a multilayer structure, changing the thickness ratio between the two layers (see FIGS. 4–7) can modify the coercivity. This can be represented by a thickness fraction Q of the first magnetic layer in the stack to the total multilayer thickness where $$Q = \frac{t_{Mag1}}{(t_{Mag1} + t_{Mag})}$$

Importantly, the coercivity can be modified by varying Q while keeping the remanence, Mrt, constant. While the overall thickness of the multiple magnetic layers can be of the same thickness as a single layer prior art magnetic medium, the thickness of the individual magnetic layers can vary from 2 nm to 50 nm respectively.

The multi-magnetic layer structure can comprise cobalt alloys with different alloying elements including one or more of chromium, platinum, tantalum, boron, niobium, molybdenum, nickel, tungsten, carbon, aluminum, iron, and manganese.

As illustrated in the graphs of FIGS. 4–7 for specific embodiments, by changing the relative thicknesses of the magnetic layers a change in coercivity is realized while keeping remanence, deposition conditions, and underlayer thickness constant. An optimum coercivity can be realized solely by the variation in thicknesses of the magnetic layers.

Figure 4:
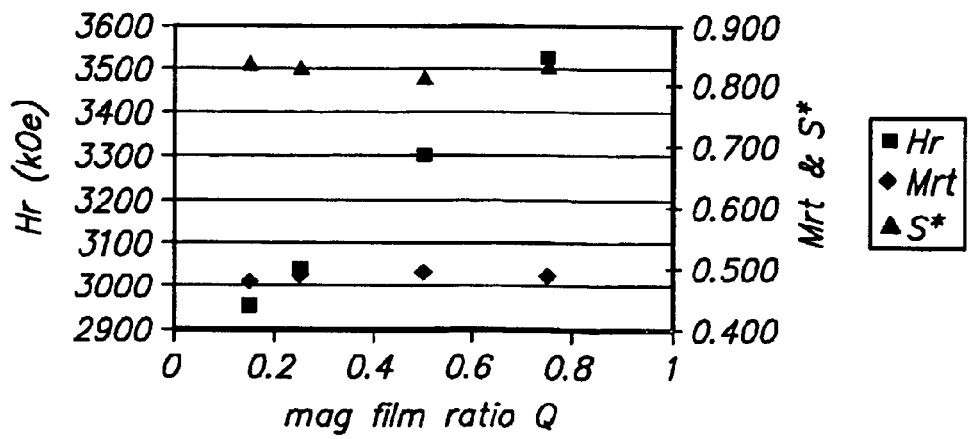
FIGS. 4–7 are graphs illustrating the effects of relative magnetic film thicknesses on recording medium parameters in accordance with four embodiments of the invention.

In FIG. 4 the effect of film fraction Q on coercivity (Hr), remanence (Mrt) and coercive squareness (S*) are illustrated for a first layer of Co-20Cr-10Pt-8B and a second layer of Co-22Cr-10Pt-6B. Coercivity is given in kiloOersterd (kOe) while remanence and coercive squareness are given in relative units.

Figure 5:
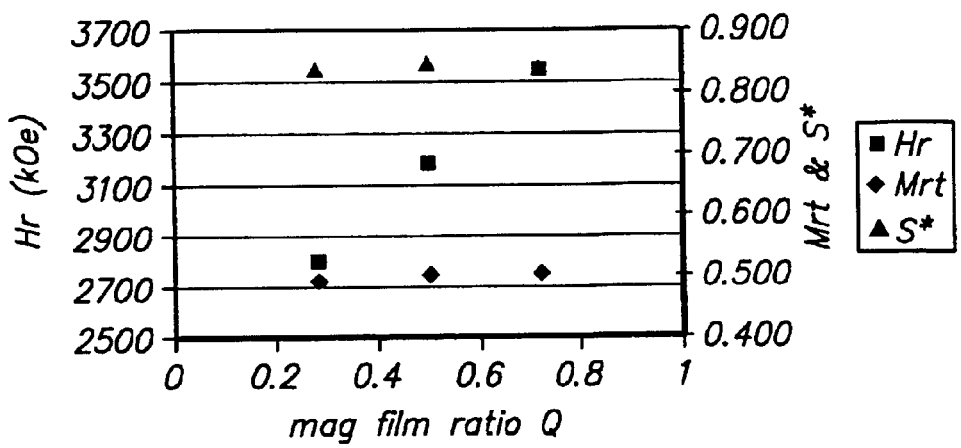
Figure 6:
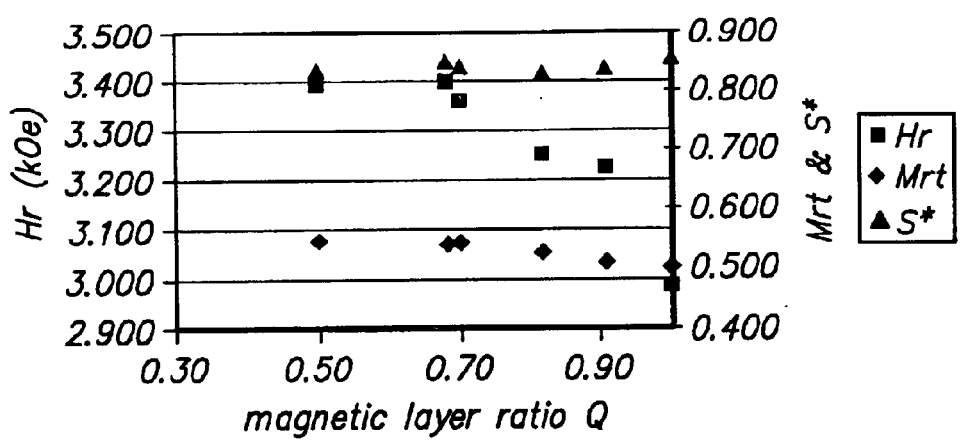
Figure 7:
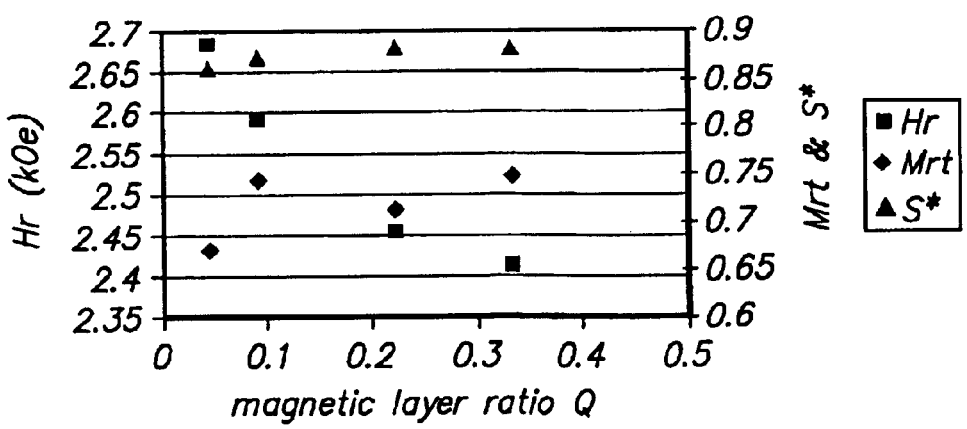

In FIG. 5 the first magnetic layer is Co-20Cr-10Pt-8B and the second layer is Co-26Cr-10Pt-6B, while in FIG. 6 the first magnetic layer is an alloy of Co-20Cr-10Pt-8B and the second layer is Co-20Cr-8-Pt-4Ta. In FIG. 7 the first magnetic layer is Co-20Cr-8Pt-4Ta and the second magnetic layer is Co-18Cr-6Pt-3Ta. In each of the figures it will be noted that varying the ratio Q has a significant effect on coercivity with little or no effect on remanence and sharpness.

While the invention has been described with reference to specific embodiments, the description is illustrative of the invention and is not to be construed as limiting the invention. For example, while two magnetic layers are described in each of the embodiments, more than two magnetic layers can be employed. Thus, various modifications and applications may occur to those skilled in the art without departing from the true spirit and scope of the invention as defined by the appended claims.

What is claimed is:

1. In the manufacture of a magnetic recording medium, a method of varying coercivity comprising the steps of:
    a) providing a substrate for supporting magnetic layers;
    b) sputtering on the substrate an underlayer having a lattice structure for matching with a magnetic layer lattice structure;
    c) sputtering a first magnetic layer on the underlayer, the first magnetic layer having a first alloy composition and a first coercivity;
    d) sputtering a second magnetic layer on and in contact with the first magnetic layer, the second magnetic layer having a second alloy composition which differs from the first alloy composition and a second coercivity which differs from the first coercivity, whereby a coercivity of the two magnetic layers is different than the first and second coercivities and is determined by the relative thicknesses of the two magnetic layers; and
    e) sputtering a third magnetic layer on the second magnetic layer.

2. The method as defined by claim 1 wherein steps c) and d) form magnetic layers each having a thickness in the range of 2 nm–50 nm.

3. The method as defined by claim 2 wherein each of the two magnetic layers comprise a cobalt alloy with at least one of chromium, platinum, tantalum, boron, niobium, molybdenum, nickel, tungsten, carbon, aluminum, iron, and manganese.

4. The method as defined by claim 3 wherein step c) forms a first magnetic layer having an alloy composition of Co-20Cr-10Pt-8B, and step d) forms a second magnetic layer having an alloy composition of Co-22Cr-10Pt-6B.

5. The method as defined by claim 3 wherein step c) forms a first magnetic layer having an alloy composition of Co-20Cr-10Pt-8B, and step d) forms a second magnetic layer having an alloy composition of Co-26Cr-10Pt-6B.

6. The method as defined by claim 3 wherein step c) forms a first magnetic layer having an alloy composition of Co-20Cr-10Pt-8B, and step d) forms a second magnetic layer having an alloy composition of Co-20Cr-8Pt-4Ta.

7. The method as defined by claim 3 wherein step c) forms a first magnetic layer having an alloy composition of Co-20Cr-8Pt-4Ta, and step d) forms a second magnetic layer having an alloy having a composition of Co-18Cr-6Pt-3Ta.

8. The method as defined by claim 3 wherein step b) includes providing an underlayer that is chromium or a chrome alloy.

9. The method as defined by claim 8 wherein step a) includes providing a substrate that is nickel phosphorus or ceramic glass.

10. The method as defined by claim 1 wherein step a) includes providing a substrate that is nickel phosphorus or ceramic glass, and step b) includes providing an underlayer that is chromium or a chrome alloy.

11. A magnetic recording medium, comprising:
    a substrate;
    an underlayer supported by the substrate;
    a first magnetic layer on the underlayer, said first magnetic layer having a first alloy composition that includes Pt and a first coercivity; and
    a second magnetic layer on and in contact with the first magnetic layer, the second magnetic layer having a second alloy composition that includes Pt which differs from the first alloy composition and a second coercivity which differs from the first coercivity, whereby a coercivity of the two magnetic layers is different than the first and second coercivities and is determined by a relative thickness of the first magnetic layer to the thickness of the first and second magnetic layers, and varying a thickness fraction of the thickness of the first magnetic layer to the thickness of the first and second magnetic layers changes the coercivity of the medium by at least 10 percent and changes the remanence of the medium by at most 5 percent.

12. The magnetic recording medium as defined by claim 11 wherein the thickness of each magnetic layer is between 2 nm and 50 nm.

13. The magnetic recording medium as defined by claim 11 wherein each of the two magnetic layers comprise an alloy of cobalt with at least one of chromium, platinum, tantalum, boron, niobium, molybdenum, nickel, tungsten, carbon, aluminum, iron, and manganese.

14. The magnetic recording medium as defined by claim 13 wherein the first magnetic layer comprises an alloy having a composition of Co-20Cr-10Pt-8B and the second magnetic layer comprises an alloy having a composition of Co-22Cr-10Pt-6B.

15. The magnetic recording medium as defined by claim 13 wherein the first magnetic layer comprises an alloy having a composition of Co-20Cr-10Pt-8B, and the second magnetic layer comprises an alloy having a composition of Co-26Cr-10Pt-6B.

16. The magnetic recording medium as defined by claim 13 wherein the first magnetic layer comprises an alloy having a composition of Co-20Cr-10Pt-8B, and the second magnetic layer comprises an alloy having a composition of Co-20Cr-8Pt-4Ta.

17. The magnetic recording medium as defined by claim 13 wherein the first magnetic layer comprises an alloy having a composition of Co-20Cr-8Pt-4Ta, and the second magnetic layer comprises an alloy having a composition of Co-18Cr-6Pt-3Ta.

18. The magnetic recording medium as defined by claim 11 wherein the substrate is nickel phosphorus or ceramic glass, and the underlayer is chromium or chrome alloy.

19. The magnetic recording medium as defined by claim 18 and further including a seedlayer between the underlayer and the substrate, a carbon overcoat layer over the second magnetic layer, and a lubricant layer on the carbon overcoat layer.

20. A method for establishing a coercivity of magnetic recording material on a substrate comprising the steps of providing a substrate and first and second cobalt based alloy magnetic layers sputtered in sequence on the substrate and in contact with one another, wherein the first magnetic layer has a first quaternary alloy composition and a first coercivity, the second magnetic layer has a second quaternary alloy composition and a second coercivity, with the relative thicknesses of the first and second magnetic layers determining the coercivity of the material, the coercivity of the material being different than the first and second coercivities, and varying a thickness fraction of the thickness of the first magnetic layer to the thickness of the first and second magnetic layers changes the coercivity of the material by at least 10 percent and chances the remanence of the material by at most 5 percent.

21. A magnetic recording medium, comprising:
a substrate;
a first magnetic layer over the substrate, wherein the first magnetic layer has a first alloy composition and a first coercivity; and
a second magnetic layer on and in contact with the first magnetic layer, wherein the second magnetic layer has a second alloy composition and a second coercivity, the first and second alloy compositions are different, the first and second coercivities are different, a coercivity of the medium is different than the first and second coercivities, and varying a thickness fraction of the thickness of the first magnetic layer to the thickness of the first and second magnetic layers changes the coercivity of the medium a first percentage, changes the remanence of the medium a second percentage, and the first percentage is at least twice the second percentage.

22. The magnetic recording medium as defined by claim 21 wherein the first and second alloy compositions are quaternary alloy compositions.

23. The magnetic recording medium as defined by claim 22 wherein the first and second alloy compositions have the same four elements.

24. The magnetic recording medium as defined by claim 23 wherein the first alloy composition is Co-20Cr-10Pt-8B and the second alloy composition is Co-22Cr-10Pt-6B.

25. The magnetic recording medium as defined by claim 23 wherein the first alloy composition is Co-20Cr-10Pt-8B and the second alloy composition is Co-26Cr-10Pt-6B.

26. The magnetic recording medium as defined by claim 23 wherein the first alloy composition is Co-20Cr-8Pt-4Ta and the second alloy composition is Co-18Cr-6Pt-3Ta.

27. The magnetic recording medium as defined by claim 22 wherein the first and second alloy compositions have the same three elements and a different fourth element.

28. The magnetic recording medium as defined by claim 27 wherein the first alloy composition is Co-20Cr-10Pt-8B and the second alloy composition is Co-20Cr-8Pt-4Ta.

29. The magnetic recording medium as defined by claim 21 wherein the first and second magnetic layers are deposited under the same deposition conditions.

30. The magnetic recording medium as defined by claim 21 wherein the coercivity of the medium is determined by the thickness fraction $t_{Mag1}/(t_{Mag1}+t_{Mag2})$ where $t_{Mag1}$ is the thickness of the first magnetic layer and $t_{Mag2}$ is the thickness of the second magnetic layer.

31. A magnetic recording medium, comprising:
a substrate;
a first magnetic layer over the substrate, wherein the first magnetic layer has a first alloy composition and a first coercivity and is sputter deposited over the substrate under a first deposition condition that includes a temperature and bias of the substrate; and
a second magnetic layer on and in contact with the first magnetic layer, wherein the second magnetic layer has a second alloy composition and a second coercivity and is sputter deposited on the first magnetic layer under a second deposition condition that includes a temperature and bias of the substrate, the first and second alloy compositions are different compositions that contain Co and Pt, the first and second coercivities are different, the first and second deposition conditions are the same, a coercivity of the medium is different than the first and second coercivities, and varying a thickness fraction of the thickness of the first magnetic layer to the thickness of the first and second magnetic layers changes the coercivity of the medium a first percentage, changes the remanence of the medium a second percentage, and the first percentage is at least twice the second percentage.

32. The magnetic recording medium as defined by claim 31 wherein the first and second alloy compositions are quaternary alloy compositions.

33. The magnetic recording medium as defined by claim 32 wherein the first and second alloy compositions have the same four elements.

34. The magnetic recording medium as defined by claim 33 wherein the first alloy composition is Co-20Cr-10Pt-8B and the second alloy composition is Co-22Cr-10Pt-6B.

35. The magnetic recording medium as defined by claim 33 wherein the first alloy composition is Co-20Cr-10Pt-8B and the second alloy composition is Co-26Cr-10Pt-6B.

36. The magnetic recording medium as defined by claim 33 wherein the first alloy composition is Co-20Cr-8Pt-4Ta and the second alloy composition is Co-18Cr-6Pt-3Ta.

37. The magnetic recording medium as defined by claim 32 wherein the first and second alloy compositions have the same three elements and a different fourth element.

38. The magnetic recording medium as defined by claim 37 wherein the first alloy composition is Co-20Cr-10Pt-8B and the second alloy composition is Co-20Cr-8Pt-4Ta.

39. The magnetic recording medium as defined by claim 31 wherein varying the thickness fraction changes the coercivity of the medium by at least 10 percent and changes the remanence of the medium by at most 5 percent.

40. The magnetic recording medium as defined by claim 31 wherein the coercivity of the medium is determined by the thickness fraction $t_{Mag1}/(t_{Mag1}+t_{Mag2})$ where $t_{Mag1}$ is the thickness of the first magnetic layer and $t_{Mag2}$ is the thickness of the second magnetic layer.

41. A magnetic recording medium, comprising:
a substrate;
a first magnetic layer over the substrate, wherein the first magnetic layer has a first alloy composition and a first coercivity; and
a second magnetic layer on and in contact with the first magnetic layer, wherein the second magnetic layer has a second alloy composition and a second coercivity, the first and second alloy compositions are different quaternary alloy compositions, the first and second coercivities are different, a coercivity of the medium is different than the first and second coercivities, and varying a thickness fraction of the thickness of the first magnetic layer to the thickness of the first and second magnetic layers changes the coercivity of the medium a first percentage, changes the remanence of the medium a second percentage, and the first percentage is at least twice the second percentage.

42. The magnetic recording medium as defined by claim 41 wherein the first and second alloy compositions include Co, Cr and Pt.

43. The magnetic recording medium as defined by claim 42 wherein the first and second alloy compositions have the same four elements.

44. The magnetic recording medium as defined by claim 43 wherein the first alloy composition is Co-20Cr-10Pt-8B and the second alloy composition is Co-22Cr-10Pt-6B.

45. The magnetic recording medium as defined by claim 43 wherein the first alloy composition is Co-20Cr-10Pt-8B and the second alloy composition is Co-26Cr-10Pt-6B.

46. The magnetic recording medium as defined by claim 43 wherein the first alloy composition is Co-20Cr-8Pt-4Ta and the second alloy composition is Co-18Cr-6Pt-3Ta.

47. The magnetic recording medium as defined by claim 42 wherein the first and second alloy compositions have the same three elements and a different fourth element.

48. The magnetic recording medium as defined by claim 47 wherein the first alloy composition is Co-20Cr-10Pt-8B and the second alloy composition is Co-20Cr-8Pt-4Ta.

49. The magnetic recording medium as defined by claim 41 wherein the first and second magnetic layers are deposited under the same deposition conditions.

50. The magnetic recording medium as defined by claim 41 wherein the coercivity of the medium is determined by the thickness fraction $t_{Mag1}/(t_{Mag1}+t_{Mag2})$ where $t_{Mag1}$ is the thickness of the first magnetic layer and $t_{Mag2}$ is the thickness of the second magnetic layer.

51. A magnetic recording medium, comprising:
a substrate;
an underlayer supported by the substrate;
a first magnetic layer on the underlayer, said first magnetic layer having a first alloy composition of Co-20Cr-10Pt-8B and a first coercivity; and
a second magnetic layer on and in contact with the first magnetic layer, the second magnetic layer having a second alloy composition of Co-22Cr-10Pt-6B and a second coercivity which differs from the first coercivity, whereby a coercivity of the two magnetic layers is different than the first and second coercivities and is determined by a relative thickness of the first magnetic layer to the thickness of the two magnetic layers.

52. A magnetic recording medium, comprising:
a substrate;
an underlayer supported by the substrate;
a first magnetic layer on the underlayer, said first magnetic layer having a first alloy composition of Co-20Cr-10Pt-8B and a first coercivity; and
a second magnetic layer on and in contact with the first magnetic layer, the second magnetic layer having a second alloy composition of Co-26Cr-10Pt-6B and a second coercivity which differs from the first coercivity, whereby a coercivity of the two magnetic layers is different than the first and second coercivities and is determined by a relative thickness of the first magnetic layer to the thickness of the two magnetic layers.

53. A magnetic recording medium, comprising:
a substrate;
an underlayer supported by the substrate;
a first magnetic layer on the underlayer, said first magnetic layer having a first alloy composition of Co-20Cr-10Pt-8B and a first coercivity; and
a second magnetic layer on and in contact with the first magnetic layer, the second magnetic layer having a second alloy composition of Co-20Cr-8Pt-4Ta and a second coercivity which differs from the first coercivity, whereby a coercivity of the two magnetic layers is different than the first and second coercivities and is determined by a relative thickness of the first magnetic layer to the thickness of the two magnetic layers.

54. A magnetic recording medium, comprising:
a substrate;
an underlayer supported by the substrate;
a first magnetic layer on the underlayer, said first magnetic layer having a first alloy composition of Co-20Cr-8Pt-4Ta and a first coercivity; and
a second magnetic layer on and in contact with the first magnetic layer, the second magnetic layer having a second alloy composition of Co-18Cr-6Pt-3Ta and a second coercivity which differs from the first coercivity, whereby a coercivity of the two magnetic layers is different than the first and second coercivities and is determined by a relative thickness of the first magnetic layer to the thickness of the two magnetic layers.

55. A magnetic recording medium, comprising:
a substrate;
an underlayer supported by the substrate;
a first magnetic layer on the underlayer, said first magnetic layer having a first quaternary alloy composition that includes Co, Cr and Pt and a first coercivity; and
a second magnetic layer on and in contact with the first magnetic layer, the second magnetic layer having a second quaternary alloy composition that includes Co, Cr, Pt and Ta which differs from the first alloy composition a second coercivity which differs from the first coercivity, whereby a coercivity of the two magnetic layers is different than the first and second coercivities and is determined by a relative thickness of the first magnetic layer to the thickness of the two magnetic layers.

56. A magnetic recording medium, comprising:
a substrate;
an underlayer supported by the substrate;
a first magnetic layer on the underlayer, said first magnetic layer having a first alloy composition and a first coercivity; and
a second magnetic layer on and in contact with the first magnetic layer, wherein the second magnetic layer has a second alloy composition and a second coercivity, the first and second alloy compositions are different, the first and second coercivities are different, a coercivity of the medium is different than the first and second coercivities, and varying a thickness fraction of the thickness of the first magnetic layer to the thickness of the first and second magnetic layers changes the coercivity of the medium by at least 10 percent and changes the remanence of the medium by at most 5 percent.

57. The magnetic recording medium as defined by claim 56 wherein the first and second alloy compositions include Co and Pt.

58. The magnetic recording medium as defined by claim 57 wherein the first and second alloy compositions include Cr.

59. The magnetic recording medium as defined by claim 58 wherein the first and second alloy compositions are quaternary alloy compositions.

60. The magnetic recording medium as defined by claim 59 wherein the first alloy composition includes B and the second alloy composition includes B or Ta.

* * * * *

UNITED STATES PATENT AND TRADEMARK OFFICE
CERTIFICATE OF CORRECTION

PATENT NO. : 6,753,100 B1
DATED : June 22, 2004
INVENTOR(S) : Bunsen Y. Wong et al.

Page 1 of 1

It is certified that error appears in the above-identified patent and that said Letters Patent is hereby corrected as shown below:

Column 3,
Line 60, change "two" to -- first and second --.

Signed and Sealed this

Sixteenth Day of November, 2004

JON W. DUDAS
*Director of the United States Patent and Trademark Office*